Jan. 20, 1970   J. R. BULCK ET AL   3,490,113
APPARATUS FOR MAKING CURVED PLASTIC SHAPES
Filed June 5, 1967   2 Sheets-Sheet 1
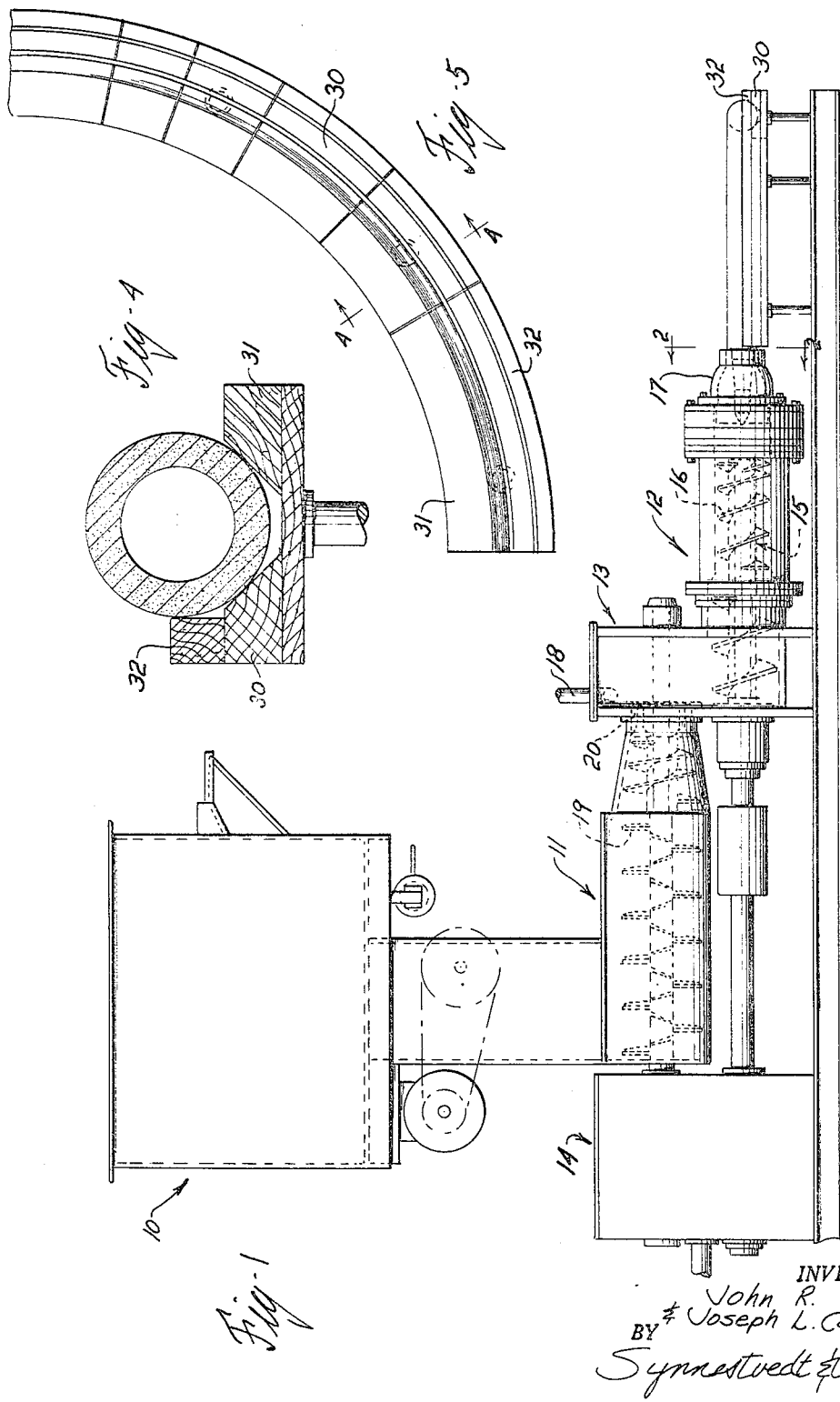
INVENTORS
John R. Bulck
& Joseph L. Congelosi
BY
Synnestvedt & Lechner
ATTORNEYS INVENTORS
John R. Bulck
Joseph L. Cangelosi
BY
Synnestvedt & Lechner
ATTORNEYS

United States Patent Office 3,490,113
Patented Jan. 20, 1970

3,490,113
**APPARATUS FOR MAKING CURVED
PLASTIC SHAPES**
John R. Bulck, Williamsville, N.Y., and Joseph L. Cangelosi, Caparra Heights, Puerto Rico, assignors to Certain-Teed Products Corporation, Ardmore, Pa., a corporation of Maryland
Filed June 5, 1967, Ser. No. 643,441
Int. Cl. B28b 3/22
U.S. Cl. 25—11                                     5 Claims

ABSTRACT OF THE DISCLOSURE

An extrusion process and apparatus for forming elongated curved articles, e.g. pipe, from a plastic material, e.g. asbestos cement.

---

This invention relates to the extrusion of rigid articles or shapes composed of plastic materials and is especially concerned with apparatus for making elongated curved shapes such as pipes, beams and columns.

Although the invention is suitable for the manufacture of a wide variety of hollow curved shapes, it is particularly well suited for the production of asbestos cement pipe sections and the production of such pipe sections will be explained for illustrative purposes.

According to prior art techniques, asbestos cement shapes have been produced in large part by the so-called Mazza technique in which thin layers of asbestos cement are rolled upon a mandrel until the desired pipe thickness is obtained. More recently, certain developments have resulted in the production of commercially acceptable asbestos cement shapes by screw extrusion. However, until now, it has not been practical to form curved sections and particularly curved pipe sections by either process. One of the problems preventing the formation of commercially acceptable curved sections by these prior art techniques arises from the fact that when a section is made and then bent to the curvature desired as has been heretofore customary, the material in the outer wall will be stretched and the material of the other sidewall will be compressed. Obviously, the stretched side is a great deal weaker than the opposite side, especially when bends having any appreciable curvature are made. Such sections tend to crack because of the stresses developed during bending and are difficult and time consuming to make. Although other attempts have been made to solve the problems described above, all other approaches are rather costly and time consuming and have not been accepted by the industry.

We have found that curved pipe sections, as well as other shapes, can be made by means of an extrusion process and that when the principles of our invention are employed, stress-free sections can be readily extruded having a ninety degree bend or even more, and it is the primary object of our invention to provide apparatus for forming such sections. Further important objects of the invention include the manufacture of sections which can be made simply and economically with little modification of existing extrusion equipment, and the provision of curved sections which are significantly stronger than those manufactured by the conventional technique.

According to the invention, the curved pieces are made by forming the extrusion orifice so that more material is delivered to the outer wall of the section. We can accomplish this by offsetting the external forming die of the extruder relative to the die core by an amount required to increase the speed of extrusion of the outermost wall portion of the bend relative to the inner wall. In other words, as the extruder forces the material through the die orifice, more will flow out through that portion of the orifice having the larger area than the portion of smaller area lying on the opposite side of the core. This causes the piece to develop a curvature which is directly related to the amount of offset. The curving piece is fed directly into a curved guide form which is provided with the exact curvature desired, and extends for a distance somewhat greater than the maximum arcuate length desired. Thereafter, and while the piece is still in a soft state, bends of the arcuate length required can be cut.

The manner in which the foregoing is achieved will be fully explained in the following description when taken in conjunction with the accompanying drawings which show an illustrative embodiment of the invention.

In the drawings:

FIGURE 1 shows a side elevational view of the overall arrangement of equipment suitable for the production of curved extruded pieces;

FIGURES 4 and 5 illustrate the guide structure which leads from the exit end of the extruder.

Figure 3:
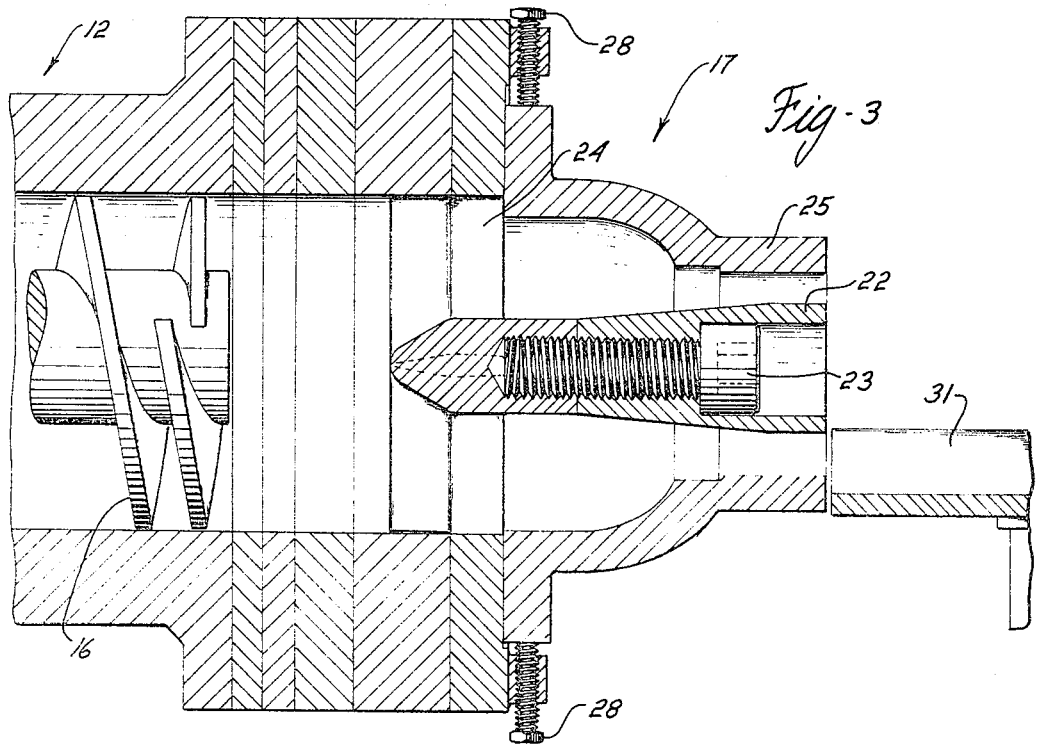
FIGURE 3 is a sectional view taken along lines 3—3 of FIGURE 2.

Reference is first made to FIGURE 1 for a general explanation of a form of extrusion apparatus especially suited for making the asbestos cement pipe sections of the present invention. The upper left hand portion of FIGURE 1 illustrates mixing equipment, generally indicated at 10, in which a furnish which is comprised mainly of portland cement, water and asbestos fibers is prepared. The furnish is delivered from the mixing equipment 10 to a pug mill of known type, indicated generally at 11. The exit end of the pug mill leads to the extruder indicated generally at 12 through an interconnecting vacuum chamber 13. The screw within the pug mill and the screw within the extruder are both adapted to be driven by means of a drive mechanism indicated generally at 14.

Most of the details of the components 10 through 14 need not be considered in detail herein as these are now generally known in the art. By way of orientation, however, the extruder 12 comprises a cylindrical shell in which is screw 15 is mounted for rotation. The screw is provided with blades 16 of decreasing pitch toward the exit end (toward the right in FIGURE 1) in order to increase the compression of the material about to leave the extruder. A nozzle portion 17 providing a generally circular orifice is bolted to the exit end of the extruder as will be fully described hereinafter.

The input end of the extruder receives the furnish through the vacuum chamber 13 in which a vacuum is drawn through a vacuum line 18. The furnish is delivered to the upper portion of the vacuum chamber by means of a screw 19, located within the pug mill 11. The flights or turns of the screw in the pug mill are also of decreasing pitch towards the discharge end in order to increase the amount of compression of the furnish just as it is delivered to the vacuum chamber. Suitable choppers, indicated diagrammatically at 20, are arranged at the delivery end of the pug mill for the purpose of subdividing the material so that air and other entrapped gases are released as is known in the art.

The mixing apparatus 10 is of a conventional type and is provided for thoroughly mixing the furnish before the delivery to the pug mill. Suitable apparatus and mixing techniques for accomplishing thorough mixing of the furnish are disclosed in the co-pending application of Joseph L. Cangelosi and Frederick E. Hawkins, Ser. No. 511,732, filed Dec. 6, 1965, of which a continuation-in-part application Ser. No. 767,892 was filed Sept. 9, 1968, said applications being assigned to the assignee of this application. For purposes of illustration, a suitable combination of ingredients for extrusion purposes comprises a mixture of about 30 pounds of asbestos fibers to each 100 pounds of cement.

In preparing the mixture, the dry ingredients are first thoroughly mixed in the mixing apparatus, a total batch of about 440 pounds of dry ingredients being mixed, for a period of about five minutes in a typical operation. After this dry mixing, water, typically in an amount of 24 parts by weight for each 100 parts of mixed dry ingredients, are added while mixing is continued. Preferably, the water is added as rapidly as conveniently practical, for instance, in about ten seconds. After a suitable period of time, when the mixture is thoroughly mixed, the mixing operation is terminated and the furnish delivered to the pug mill.

Figure 2:
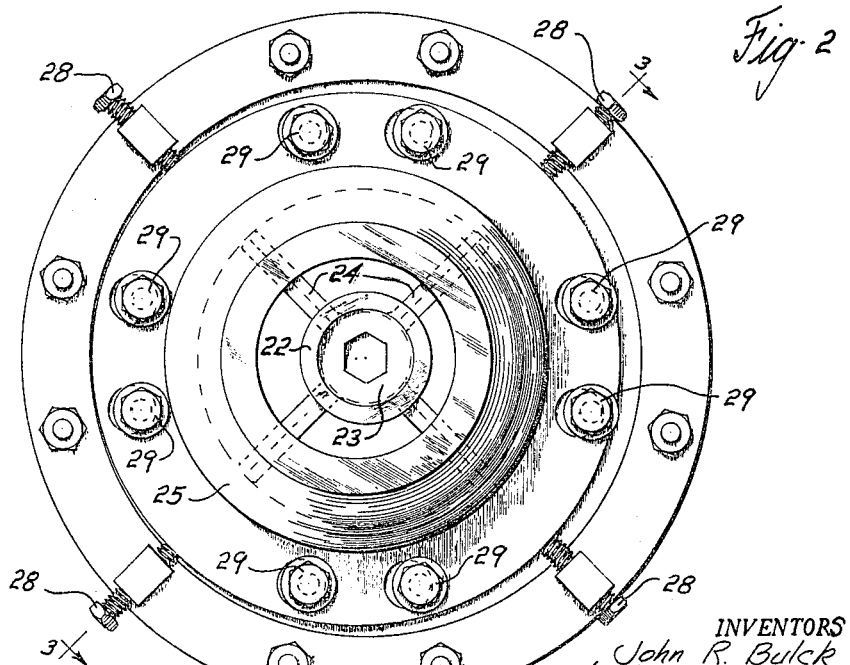
FIGURE 2 is an enlarged view of the extrusion orifice and structure related thereto as shown in FIGURE 1.

The extrusion die orifice is shown most clearly in FIGURES 2 and 3. As shown in those figures, the internal die or core 22 is secured by means of a bolt 23 to the center portion of a spider having arms 24. The exterior die member or nozzle 25 fits over the core, the two parts forming an annular orifice or opening surrounding the core member 22.

The external die is positioned by means of adjusting the screws 28, four of which are typically provided as shown in FIGURE 2. Upon movement to the desired location with respect to the core 22, the external die member is thereafter bolted in place by means of bolts 29.

As mentioned above, the invention contemplates the offsetting of the axis of the external die member with respect to the axis of the core so that the area of the annular opening on one side of the core is larger than the area on the other side as may be clearly seen in FIGURE 2. When the die is so spaced and the extruder in operation, material will be extruded at a higher rate through the section having the larger area than the portion of smaller area and the pipe will naturally tend to assume a curved shape as it leaves the orifice.

At the exit end of the extruder, we provide a guide structure which guides the pipe in a path having the desired radius of curvature. As shown in FIGURE 4, the support provides for three point guiding contact by means of inclined guide members 30, 31 and guide rail 32. Preferably, the guide rail 32 engages the pipe sidewall at a point just above its center line so that the pipe is properly guided.

For most practical purposes, we have found that a guide track whose path subtends an arc slightly greater than ninety degrees will be sufficient. For ease of handling of the extruded pieces, the guide track extends in a horizontal path. Once a section of pipe having a length equal to the length of the guide track is extruded, the section is trimmed to the required length. Preferably, transversely extending guide slots shown in FIGURE 5 are provided at measured intervals along the track. The guide slots are adapted to receive the blade of a rotary cutter so the different arcuate lengths of pipe may be accurately cut. After the pipe is cut to the desired length, it may be removed from the guide track and placed on a suitable curing form for curing.

The amount of offset of the axis of the external die with respect to the axis of the core is directly related to the permissible radius of curvature of the pipe section and is a matter which can be readily determined after a few simple trials. Pipe sections having a 4" ID and a radius curvature of 36" have been in use for extended periods of time and in tests these exhibit strength characteristics similar to straight sections. Moreover, sections of this size range have been successfully extruded with radius of curvature of less than 24". There appears to be no reason why sections having a much smaller radius could not be extruded if required, although for asbestos cement pipe, a 36" radius of curvature has been found to be preferred for most commercial purposes.

We claim:
1. Apparatus for extruding elongated curved hollow structural shapes from a moistened admixture of asbestos and cement comprising an extruder having an external extrusion die with an opening defining the exterior cross sectional profile of the shape, a core in said opening, the axes of the die and core lying in a common plane, with the axis of the die offset in said plane relatively to the axis of the core and defining an annular discharge orifice of greater radial dimension in said plane at one circumferential point of the orifice than at the diametrically opposite point, and a guide track leading from said orifice, said guide track comprising a support member providing a curved guide path leading away from said orifice in said plane, the axis of said curved path diverging from the axis of the core toward that side of the core axis adjacent to the portion of the annular orifice of smaller radial dimension.

2. Apparatus according to claim 1 in which said points of greater and smaller radial dimension of the orifice lie in a substantially horizontal plane and in which the guide track also lies in said substantially horizontal plane.

3. Apparatus according to claim 1, further including a plurality of spaced apart guide slots extending transversely of said curved path, providing for the cut-off of measured arcuate sections of the shapes.

4. Apparatus according to claim 1 wherein said hollow structural shapes are pipes having a circular cross section.

5. Apparatus according to claim 4, wherein said guide track comprises a pair of inwardly sloping guide rails providing for line contact with said pipe, and a third vertically extending guide surface, said rails and said surface providing for line contact at three angularly spaced points about the circumference of a pipe being extruded from said orifice.

References Cited

UNITED STATES PATENTS

| | | |
|---|---|---|
| 2,167,971 | 8/1939 | Cadden. |
| 2,627,083 | 2/1953 | Witthoft. |
| 3,229,006 | 1/1966 | Nohl. |
| 3,276,076 | 10/1966 | Ryan et al. |

FOREIGN PATENTS

| | | |
|---|---|---|
| 1,107,926 | 3/1961 | Germany. |

WILLIAM J. STEPHENSON, Primary Examiner

U.S. Cl. X.R.

18—12